(12) United States Patent
Urbach

(10) Patent No.: US 9,010,208 B2
(45) Date of Patent: Apr. 21, 2015

(54) YOKE ASSEMBLY FOR A RACK AND PINION STEERING GEAR AND METHOD FOR PRODUCING THE SAME

(75) Inventor: Brian A. Urbach, Rochester Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 322 days.

(21) Appl. No.: 13/548,453

(22) Filed: Jul. 13, 2012

(65) Prior Publication Data

US 2014/0013901 A1    Jan. 16, 2014

(51) Int. Cl.
*F16H 57/02*     (2012.01)
*F16H 55/28*     (2006.01)

(52) U.S. Cl.
CPC ......... *F16H 55/283* (2013.01); *Y10T 29/49462* (2013.01); *Y10T 74/2186* (2013.01)

(58) Field of Classification Search
CPC ......... B62D 3/123; B62D 3/02; F16H 55/283
USPC ...... 74/498, 388 PS, 422, 409; 29/893, 897.2
See application file for complete search history.

(56) References Cited

U.S. PATENT DOCUMENTS

| | | | | |
|---|---|---|---|---|
| 4,095,482 | A * | 6/1978 | Kirschner | 74/498 |
| 4,322,986 | A * | 4/1982 | Adams et al. | 74/89.18 |
| 4,619,155 | A * | 10/1986 | Futaba | 74/498 |
| 4,680,981 | A * | 7/1987 | Downing | 74/422 |
| 4,691,583 | A * | 9/1987 | Taig | 74/422 |
| 6,067,713 | A * | 5/2000 | Bugosh | 29/893.1 |
| 6,467,366 | B1 | 10/2002 | Gierc | |
| 6,591,706 | B2 | 7/2003 | Harer et al. | |
| 6,595,532 | B2 * | 7/2003 | Tanaka | 280/93.515 |
| 6,619,420 | B1 | 9/2003 | Saarinen | |
| 7,225,522 | B1 * | 6/2007 | Little | 29/505 |
| 7,281,444 | B1 | 10/2007 | Bishop | |
| 7,487,984 | B1 * | 2/2009 | Lemont et al. | 280/93.514 |
| 7,614,317 | B2 * | 11/2009 | Sickert et al. | 74/422 |
| 7,815,204 | B2 * | 10/2010 | Kaida et al. | 280/93.514 |
| 7,930,951 | B2 * | 4/2011 | Eickholt | 74/388 PS |
| 8,511,191 | B2 * | 8/2013 | Kawakubo et al. | 74/409 |
| 8,714,042 | B2 * | 5/2014 | Yu et al. | 74/422 |

(Continued)

FOREIGN PATENT DOCUMENTS

| | | |
|---|---|---|
| EP | 1867551 A1 | 12/2007 |
| KR | 2019990031119 U | 7/1999 |
| KR | 1020010047816 A | 6/2001 |

OTHER PUBLICATIONS

International Search Report for PCT/US2013/050198 dated Oct. 21, 2013.

*Primary Examiner* — David M Fenstermacher
(74) *Attorney, Agent, or Firm* — MacMillan, Sobanski & Todd, LLC

(57) ABSTRACT

A yoke assembly adapted for use in a rack and pinion steering gear assembly for a vehicle comprises a yoke housing having a bore; a yoke bearing disposed in the bore; a yoke cover secured in the bore; a spring disposed in the bore between the yoke bearing and the yoke cover; and an automatic-adjusting mechanism secured in the yoke cover. The automatic-self adjusting mechanism includes a member which is configured to self adjust and move in a direction toward the yoke bearing so as to maintain the member in constant contact against the yoke bearing as associated components of the rack and pinion steering gear wear.

18 Claims, 4 Drawing Sheets

(56) References Cited

U.S. PATENT DOCUMENTS

| | | |
|---|---|---|
| 8,752,445 B2 * | 6/2014 | Bareis et al. .................. 74/422 |
| 8,794,093 B2 * | 8/2014 | Bareis ...................... 74/388 PS |
| 2001/0025738 A1 * | 10/2001 | Irvine et al. .................. 180/428 |
| 2002/0124670 A1 * | 9/2002 | Bugosh .................... 74/388 PS |
| 2002/0162412 A1 * | 11/2002 | Harer et al. ..................... 74/422 |
| 2004/0108676 A1 * | 6/2004 | Bareis ..................... 280/93.514 |
| 2007/0209463 A1 * | 9/2007 | Song et al. ................ 74/388 PS |
| 2008/0202271 A1 * | 8/2008 | Heo ............................... 74/422 |

* cited by examiner

YOKE ASSEMBLY FOR A RACK AND PINION STEERING GEAR AND METHOD FOR PRODUCING THE SAME

BACKGROUND OF THE INVENTION

This invention relates in general to rack and pinion steering gears and in particular to an improved yoke assembly for use in such a rack and pinion steering gear and method for producing the same A known rack and pinion steering gear includes a pinion gear that is rotatably mounted in a housing and is connectable with a steering wheel of a vehicle. A rack bar extends through the housing and has opposite end portions that are connectable with steerable vehicle wheels. The rack bar moves longitudinally relative to the housing for turning the steerable wheels of the vehicle. Gear teeth formed on the rack bar are disposed in meshing engagement with gear teeth on the pinion gear. A yoke assembly is disposed in the housing to support and guide movement of the rack bar relative to the housing. The yoke assembly includes a yoke bearing having an arcuate surface across which the rack bar moves. A spring biases the yoke bearing against the rack bar.

SUMMARY OF THE INVENTION

This invention relates to an improved yoke assembly adapted for use in a rack and pinion steering gear and method for producing the same According to an embodiment, the yoke assembly is adapted for use in a rack and pinion steering gear assembly for a vehicle and comprises: a yoke housing having a bore; a yoke bearing disposed in the bore; a yoke cover secured in the bore; a spring disposed in the bore between the yoke bearing and the yoke cover; and an automatic-adjusting mechanism secured in the yoke cover, the automatic-adjusting mechanism including a member which is configured to self adjust and move in a direction toward the yoke bearing so as to maintain the member in constant contact against the yoke bearing as associated components of the rack and pinion steering gear wear.

According to this embodiment of the yoke assembly, the member is a spring-loaded piston-like member.

According to this embodiment of the yoke assembly, the member includes an elastomer member at an end thereof which is maintained in constant contact against the yoke bearing.

According to this embodiment of the yoke assembly, the automatic adjusting mechanism includes a first member having external threads extending in a first direction and configured to be threadably disposed in an internally threaded portion of the yoke cover, and wherein the self-adjusting member includes a second member having external threads configured to be threadably disposed in an internally threaded bore provided in the first member.

According to this embodiment of the yoke assembly, the external threads of the first member extend in a first direction and the external threads of the second member extend in a second direction which is opposite to the first direction.

According to this embodiment of the yoke assembly, the automatic adjusting member further includes a third member disposed in the bore of the first member, the third member having an end in biasing contact against the second member.

According to this embodiment of the yoke assembly, the third member is a spring.

According to this embodiment of the yoke assembly, the first member includes means provided thereon configured to enable rotation of the first member relative to the yoke cover.

According to this embodiment of the yoke assembly, the automatic-adjusting mechanism further includes a nut disposed on the externally threaded portion of the first member.

According to another embodiment, a rack and pinion steering gear comprises: a housing configured to support a rack disposed in meshing engagement with a pinion, the housing including a yoke housing having a bore; a yoke bearing disposed in the bore; a yoke cover secured in the bore; a spring disposed in the bore between the yoke bearing and the yoke cover; and an automatic-adjusting mechanism secured in the yoke cover, the automatic-adjusting mechanism including a member which is configured to self adjust and move in a direction toward the yoke bearing so as to maintain the member in constant contact against the yoke bearing as associated components of the rack and pinion steering gear wear.

According to this embodiment of the rack and pinion steering gear, the member is a spring-loaded piston-like member.

According to this embodiment of the rack and pinion steering gear, the member includes an elastomer member at an end thereof which is maintained in constant contact against the yoke bearing.

According to this embodiment of the rack and pinion steering gear, the automatic adjusting mechanism includes a first member having external threads extending in a first direction and configured to be threadably disposed in an internally threaded portion of the yoke cover, and wherein the self-adjusting member includes a second member having external threads configured to be threadably disposed in an internally threaded bore provided in the first member.

According to this embodiment of the rack and pinion steering gear, the external threads of the first member extend in a first direction and the external threads of the second member extend in a second direction which is opposite to the first direction.

According to this embodiment of the rack and pinion steering gear, the automatic adjusting member further includes a third member disposed in the bore of the first member, the third member having an end in biasing contact against the second member.

According to this embodiment of the rack and pinion steering gear, the third member is a spring.

According to this embodiment of the rack and pinion steering gear, the first member includes means provided thereon configured to enable rotation of the first member relative to the yoke cover.

According to this embodiment of the rack and pinion steering gear, the automatic-adjusting mechanism further includes a nut disposed on the externally threaded portion of the first member.

According to another embodiment, a method for producing a rack and pinion steering gear comprises the steps of: installing a pre-adjusted, self-adjusting wear mechanism in a yoke cover of the rack and pinion steering gear by rotating a first member of the mechanism in a first direction until a second member of the mechanism engages a yoke bearing of the rack and pinion steering gear; and rotating the first member a predetermined number of turns relative to yoke cover so as to pre-load a second member of the mechanism relative to the first member by causing the second member to rotate in a second direction opposite to the first direction and be at least partially retracted therewithin.

According to this method for producing a rack and pinion steering gear, the first member has external threads extending in a first direction and configured to be threadably disposed in an internally threaded portion of the yoke cover, wherein the second member has external threads configured to be threadably disposed in an internally threaded bore provided in the first member, wherein the external threads of the first member extend in a first direction and the external threads of the second member extend in a second direction which is opposite to the first direction, and wherein the mechanism further includes a third member disposed in the bore of the first member, the third member having an end in biasing contact against the second member.

Other advantages of this invention will become apparent to those skilled in the art from the following detailed description of the preferred embodiments, when read in light of the accompanying drawings.

DETAILED DESCRIPTION OF THE INVENTION

Figure 1:
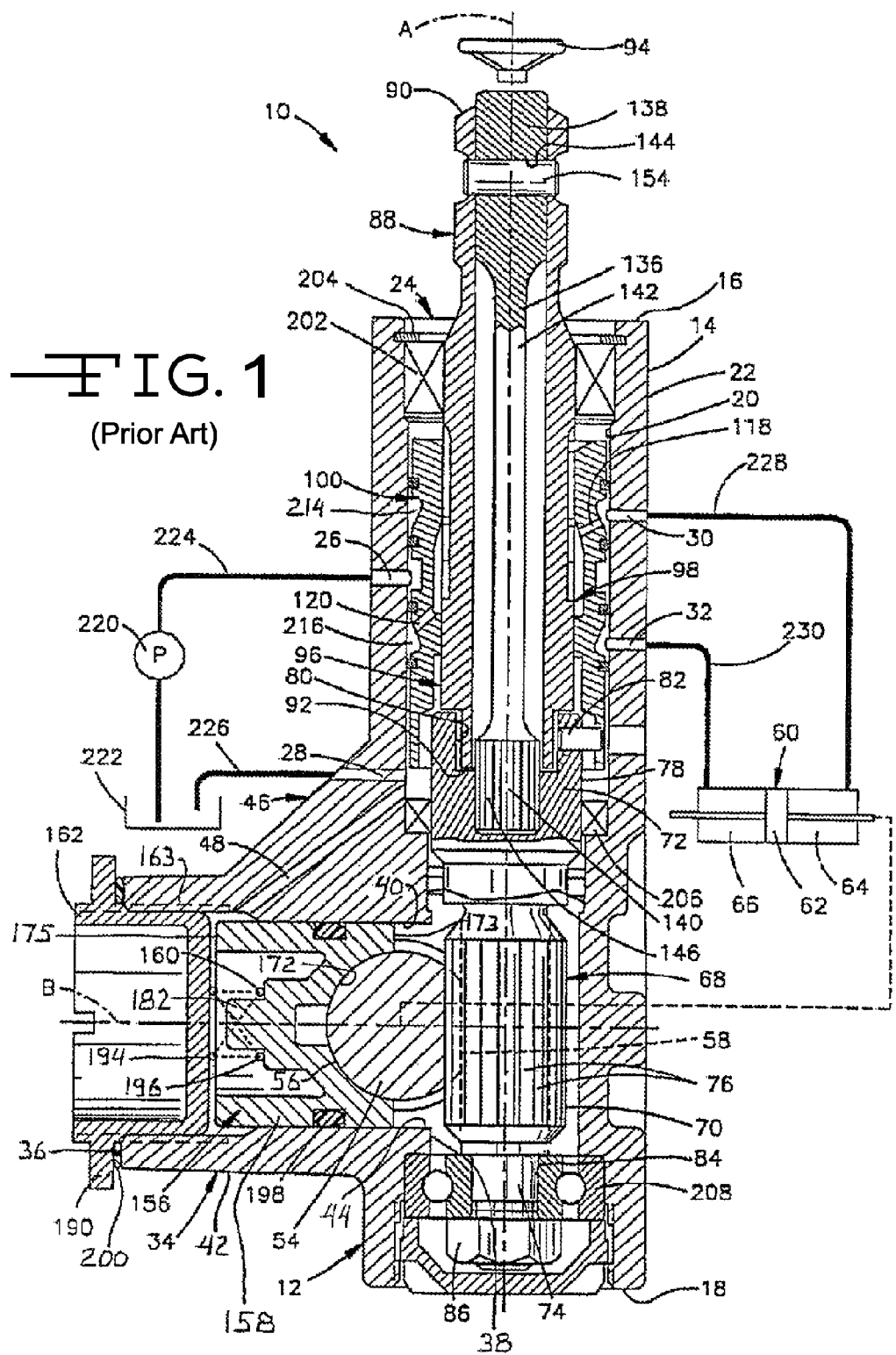
FIG. 1 is a sectional view of a prior art rack and pinion steering gear.

Referring to FIG. 1, there is illustrated a prior art rack and pinion steering gear, indicated generally at 10. The general structure and operation of the rack and pinion steering gear 10 is conventional in the art. Thus, only those portions of the steering gear 10 which are necessary for a full understanding of this invention will be explained and illustrated in detail. Also, although this invention will be described and illustrated in connection with the particular rack and pinion steering gear 10 disclosed herein, it will be appreciated that this invention may be used in connection with other types of rack and pinion steering gears. For example, the portions of the associated rack and pinion steering gear which define the present invention can be used with any of the rack and pinion steering gears shown in U.S. Pat. No. 7,281,444 B1 to Bishop, U.S. Pat. No. 7,225,522 B1 to Little, U.S. Pat. No. 6,619,420 B1 to Saarinen, U.S. Pat. No. 6,591,706 B2 to Harer et al., U.S. Pat. No. 6,467,366 B1 to Gierc, the disclosures of each of these patents incorporated herein by reference in their entirety.

The prior art rack and pinion steering gear 10 includes a housing 12. The housing 12 has a first tubular portion 14 that extends along an axis A. The first tubular portion 14 has first and second axial ends 16 and 18, respectively, and cylindrical inner and outer surfaces 20 and 22, respectively. The inner surface 20 of the first tubular portion 14 of the housing 12 defines a pinion chamber or passage 24 that extends through the first tubular portion 14. Four radially extending openings extend from the inner surface 20 to the outer surface 22 of the first tubular portion 14. The openings include a fluid inlet opening 26, a fluid outlet opening 28, and first and second motor openings 30 and 32, respectively.

The housing 12 also includes a second tubular portion or yoke housing 34. The yoke housing 34 extends perpendicular to the first tubular portion 14 along an axis B. As shown in prior art FIG. 1, the yoke housing 34 has first and second ends 36 and 38, respectively, an inner surface 40 and an outer surface 42. The second end 38 of the yoke housing 34 unites with the first tubular portion 14 near the second axial end 18 of the first tubular portion 14. The inner surface 40 of the yoke housing 34 defines a yoke chamber or yoke bore 44. The yoke bore 44 mates with the passage 24 of the first tubular portion 14 near the second axial end 18 of the first tubular portion 14. The yoke bore 44 is preferably provided with a threaded portion adjacent the first end 36.

A thickened wall portion 46 of the housing 12 is formed where the first tubular portion 14 mates with the yoke housing 34. The thickened wall portion 46 is located between the fluid outlet opening 28 of the first tubular portion 14 and the yoke housing 34 of the housing 12. A fluid passage 48 extends through the thickened wall portion 46 and connects the passage 24 of the first tubular portion 14 to the yoke bore 44 of the yoke housing 34. Preferably, the fluid passage 48 is cast into the thickened wall portion 46 of the housing 12. The fluid passage 48 fluidly connects the passage 24 and the yoke bore 44.

A longitudinally extending rack bar 54 extends through the housing 12 in a direction that is perpendicular to both axis A and axis B. The rack bar 54 has a generally circular cross-sectional shape that is defined by a generally cylindrical outer surface 56. An upper surface 58 of the rack bar 54 includes a plurality of teeth (not shown). Opposite end portions (not shown) of the rack bar 54 are connectable with steerable wheels (not shown) of a vehicle (not shown). Movement of the rack bar 54 in a longitudinal direction relative to the housing 12 results in the turning of the steerable wheels of the vehicle.

A hydraulic motor 60, shown schematically in prior art FIG. 1, is also formed in the housing 12. The hydraulic motor 60 includes a piston 62, which is attached to the rack bar 54. The piston 62 separates two variable volume chambers 64 and 66, respectively. One chamber 64 or 66 is located on each side of the piston 62. The hydraulic motor 60 is actuated when a differential pressure arises between the two chambers 64 and 66. The hydraulic motor 60 discontinues operation when the pressure between the two chambers 64 and 66 equalizes. When the hydraulic motor 60 is actuated, fluid pressure moves the piston 62. Movement of the piston 62 results in movement of the rack bar 54 in the longitudinal direction relative to the housing 12.

As shown in prior art FIG. 1, a pinion gear 68 includes a gear portion 70, a first support portion 72, and a second support portion 74. The gear portion 70 has a plurality of teeth 76 for meshingly or threadably engaging the teeth of the rack bar 54. The first support portion 72 of the pinion gear 68 forms a first axial end of the pinion gear 68. The first support portion 72 includes a cylindrical outer surface 78. An axially extending cavity 80 extends into the first support portion 72. A hole, shown generally at 82, extends radially through the first support portion 72 and terminates at the cavity 80.

The second support portion 74 of the pinion gear 68 forms a second axial end of the pinion gear 68. The second support portion 74 has a cylindrical outer surface 84. The diameter of the second support portion 74 of the pinion gear 68 is less than the diameter of the first support portion 72. An end of the cylindrical outer surface 84 of the second support portion 74, opposite the gear portion 70, is threaded for receiving a pinion nut 86.

An input shaft 88 includes first and second axial ends 90 and 92, respectively. The first axial end 90 of the input shaft 88 is connectable with a steering wheel 94 of the vehicle. The second axial end 92 of the input shaft 88 includes a valve core part 96.

The prior art rack and pinion steering gear 10 also includes a valve assembly, shown generally at 98. The valve assembly 98 includes a valve sleeve part 100 and the valve core part 96. The valve sleeve part 100 of the valve assembly 98 of the rack and pinion steering gear 10 is tubular.

A first set of passages 118 extends radially outwardly through the valve sleeve part 100. The first set of passages includes three passages 118, only one of which is shown in prior art FIG. 1. A second set of passages 120 extends radially outwardly through the valve sleeve part 100. The second set of passages 120 includes three passages 120, only one of which is shown in prior art FIG. 1.

A torsion bar 136 includes first and second axial end portions 138 and 140, respectively, and an intermediate portion 142. The first axial end portion 138 is cylindrical. A radially extending hole 144 extends through the first axial end portion 138. The second axial end portion 140 is also generally cylindrical and includes a splined outer surface 146. The first axial end portion 138 of the torsion bar 136 is then fixed to the input shaft 88 using a pin 154.

The prior art rack and pinion steering gear 10 also includes a yoke assembly 156. As shown in prior art FIG. 1, the yoke assembly 156 includes a yoke bearing 158, a spring 160, and a yoke plug 162.

The yoke bearing 158 is generally cylindrical in shape and includes a cylindrical outer side-wall 164. A recess 172 extends into a first end surface 173 of the yoke bearing 158. The recess 172 is defined by an arcuate shaped recess surface. Preferably, the arc of the arcuate shaped recess surface is partially cylindrical with a radius that is equal to a radius of the outer surface 56 of the rack bar 54. A cylindrical spring guide 182 extends outwardly from a second end surface 175 of the yoke bearing 158. The spring guide 182 is centered on the axis B.

The spring 160 of the yoke assembly 156 illustrated in prior art FIG. 1 is a helical compression spring. The spring 160 has a first axial end 194 and an opposite second axial end 196. The spring 160 also has a known spring constant. The yoke plug 162 is preferably cup-shaped and includes a threaded outer surface 163, and an outwardly extending annular flange 190.

The yoke assembly 156 also includes two fluid-tight seals 198 and 200. The seals 198 and 200 are preferably O-rings. The first seal 198 is designed to seal between the cylindrical outer side wall 164 of the yoke bearing 158 and the yoke bore 44 of the yoke housing 34 of the housing 12. The second seal 200 is designed to seal between the flange 190 of the yoke plug 162 and the first end 36 of the yoke housing 34 of the housing 12. The first seal 198 also reduces noise, vibration, and harshness (NVH) between the yoke bearing 158 and the yoke bore 44.

As shown in prior art FIG. 1, the rack and pinion steering gear 10 includes three bearing assemblies. A first bearing assembly 202 is located adjacent the opening at the first axial end 16 of the first tubular portion 14 of the housing 12. The first bearing assembly 202 extends between the housing 12 and the input shaft 88 and enables rotation of the input shaft 88 relative to the housing 12. A retaining ring 204 holds the first bearing assembly 202 in the first tubular portion 14 of the housing 12.

A second bearing assembly 206 is located in the passage 24 of the first tubular portion 14 between the fluid outlet opening 28 and the yoke bore 44. The second bearing assembly 206 extends between the housing 12 and the first support portion 72 of the pinion gear 68 and enables rotation of the pinion gear 68 relative to the housing 12.

A third bearing assembly 208 is located in the passage 24 of the first tubular portion 14 between the yoke bore 44 and the second axial end 18 of the first tubular portion 14. The third bearing assembly 208 extends between the housing 12 and the second support portion 74 of the pinion gear 68 and enables rotation of the pinion gear 68 relative to the housing 12. The third bearing assembly 208 is held in the housing 12 and relative to the pinion gear 68 by the pinion nut 86 that is screwed onto the threads of the second support portion 74.

As shown in prior art FIG. 1, a pump 220 draws hydraulic fluid from a reservoir 222 and supplies the hydraulic fluid to the rack and pinion steering gear 10. A conduit 224 extends between pump 220 and the fluid inlet opening 26 of the housing 12 for carrying fluid from the pump 220 to the rack and pinion steering gear 10. A conduit 226 extends from the fluid outlet opening 28 of housing 12 to the reservoir 222 for returning hydraulic fluid to the reservoir 222. The rack and pinion steering gear 10 also includes a conduit 228 that extends from the first motor opening 30 to the chamber 64 of the hydraulic motor 60 and a conduit 230 that extends from the second motor opening 32 to the chamber 66. As shown in prior art FIG. 1, conduit 228 provides fluid communication between a first annular motor channel 214 and the chamber 64 of the hydraulic motor 60. Conduit 230 provides fluid communication between a second annular motor channel 216 and the chamber 66 of the hydraulic motor 60. Fluid flow through the conduits 228 and 230 is bi-directional. Thus, when the volume of chamber 64 of the hydraulic motor 60 is increasing, fluid flows through the conduit 228 toward the hydraulic motor and through conduit 230 away from the hydraulic motor 60. When the volume of chamber 64 of the hydraulic motor 60 is decreasing, fluid flows through conduit 230 toward the hydraulic motor 60 and through conduit 228 away from the hydraulic motor 60.

When the prior art rack and pinion steering gear 10 is mounted in a vehicle, the input shaft 88 is operatively coupled to the steering wheel 94 of the vehicle. Rotation of the steering wheel 94 results in rotation of the input shaft 88. Since the input shaft 88 is fixed relative to the first axial end portion 138 of the torsion bar 136, rotation of the input shaft 88 results in rotation of the first axial end portion 138 of the torsion bar. If resistance to the turning of the steerable wheels of the vehicle is above a threshold level, the second axial end portion 140 of the torsion bar 136 will not be rotated by rotation of the first axial end portion 138 of the torsion bar. As a result, rotation of the first axial end portion 138 of the torsion bar 136 relative to the second axial end portion 140 will cause torsion or twisting of the intermediate portion 142 of the torsion bar. Torsion of the intermediate portion 142 of the torsion bar 136 causes the valve core part 96 to move relative to the valve sleeve part 100. The construction of the prior art rack and pinion steering gear 10 thus far described is conventional in the art.

Figure 2:
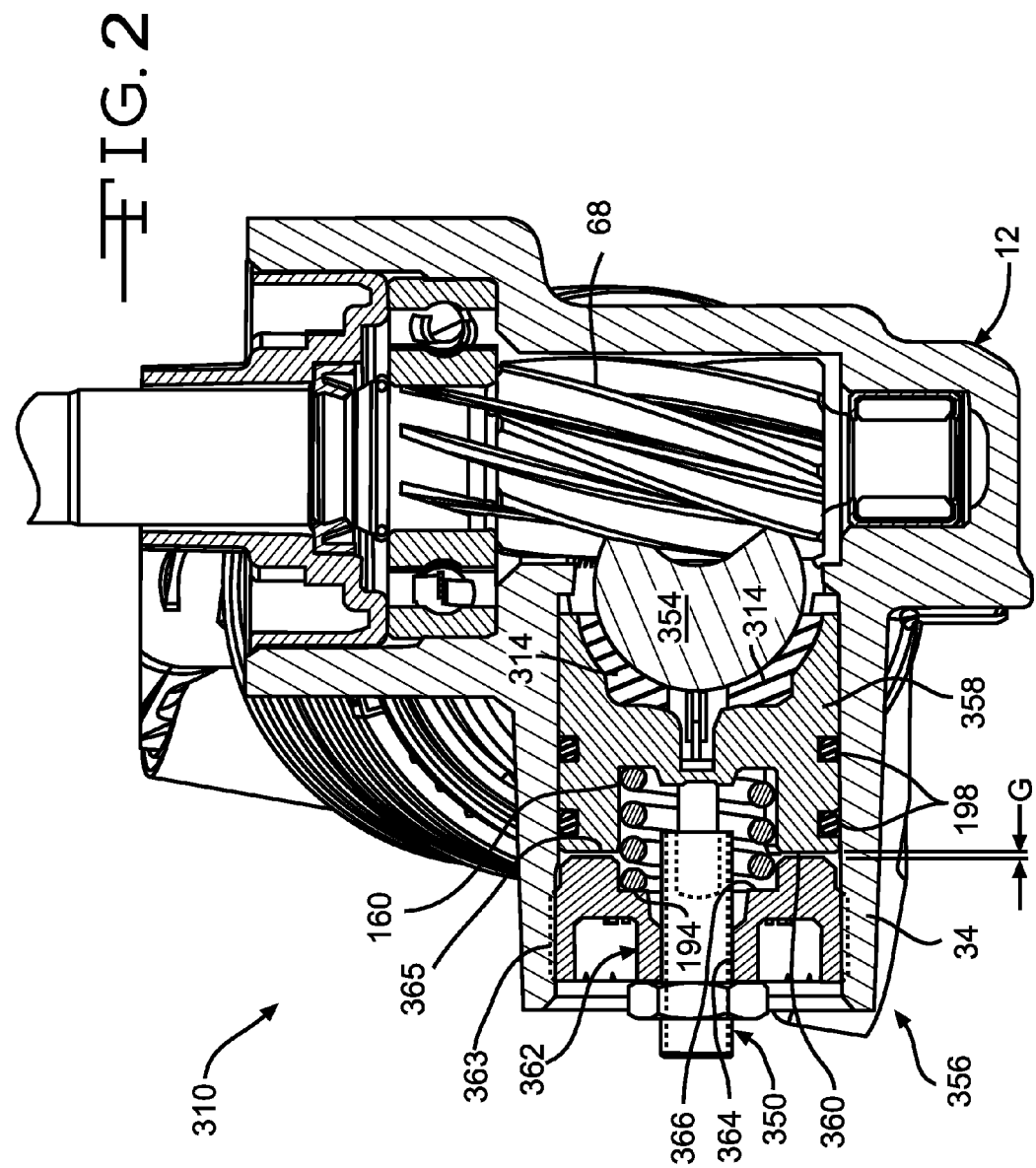
FIG. 2 is a sectional view of a portion of an embodiment of a rack and pinion steering gear having an improved yoke assembly in accordance with the present invention, showing the yoke assembly in the initially installed position and prior to wear of the associated components of the rack and pinion steering gear.

Referring now to FIG. 2 and using like reference numbers to indicate similar or corresponding parts, there is illustrated a portion of an embodiment of a rack and pinion steering gear, indicated generally at 310, having an improved yoke assembly, indicated generally at 356, in accordance with the present invention. The rack and pinion steering gear 310 is generally the same as the prior art rack and pinion steering gear 10 except for the construction of the yoke assembly 356; the use of two seals 198 between a yoke bearing 358 and the yoke housing 34; the use of a liner 314 between the rack 354 and the yoke bearing 358, and the configuration of a yoke cover or plug 362 of the yoke assembly 356. The liner 314, which in the illustrated embodiment is preferably formed from polytetraflouroethylene (PTFE), is present in the illustrated embodiment because the material of the yoke bearing 358 is zinc die cast rather than a polymer material in the case of the yoke bearing 158 illustrated in prior art FIG. 1 in which a liner is not needed. Thus, if the yoke bearing 358 is formed from a polymer material, than the liner 314 is not necessary if so desired.

In the illustrated embodiment, the yoke assembly 356 includes the yoke cover 362, the spring 160, and an "automatic-adjusting" mechanism or device, indicated generally at 350. As shown therein, the yoke cover 362 is generally U-shaped and includes an externally threaded outer surface 363 and an internally threaded through-bore 364. The externally threaded outer surface 363 is provided to enable the yoke cover 362 to be threadably installed and secured to an internally threaded portion of the yoke housing 34.

Figure 3:
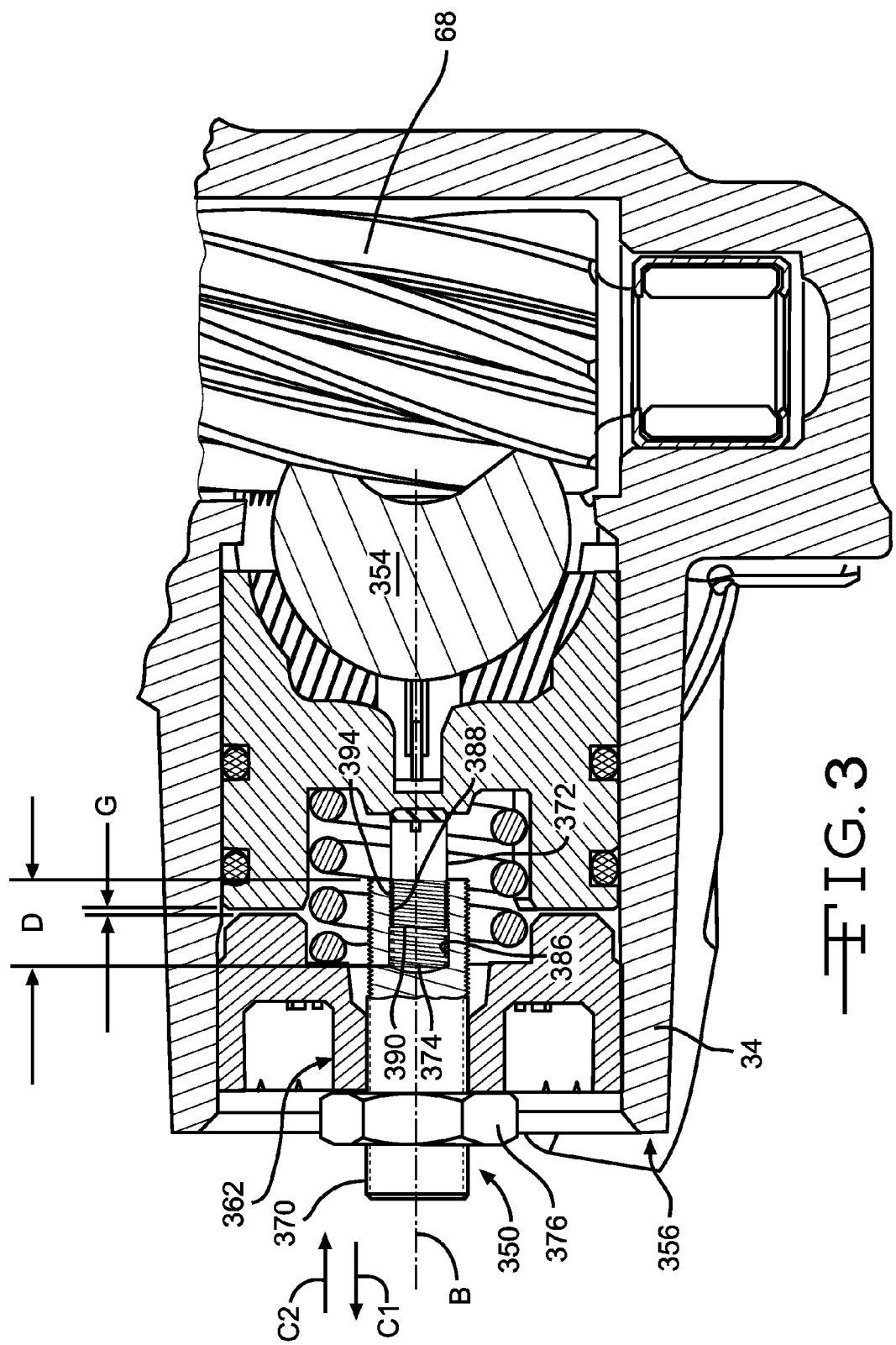
FIG. 3 is an enlarged view, partially cut-away, of a portion of the rack and pinion steering gear illustrated in FIG. 2.

In the illustrated embodiment, the yoke cover 362 further includes an end flange or face 365 and an inner shoulder 366 for receiving the axial end 194 of the spring 160. Preferably, as best shown in FIG. 3, upon the initial installation of the yoke assembly 312 and prior to any wear of the associated yoke 354 (and/or yoke liner 314 if present), there is a slight clearance of gap G between the face 365 of the yoke cover 362 and an end face 360 of the yoke bearing 358 (the gap G being shown in FIG. 3 exaggerated for clarity proposes). Preferably, the gap G is provided to prevent the yoke 354 from "bottoming out" on the yoke cover 354 (via the yoke bearing 358), thereby creating noise potential. Preferably, the gap G is a minimum of around 0.1 mm. Alternatively, the gap G could be other than illustrated and described and/or the yoke cover 362 could be installed so that the face 365 of the yoke cover 362 and the end face 360 of the yoke bearing 358 contact one another if so desired.

In the illustrated embodiment, the "automatic-adjusting" mechanism 350 is preferably a pre-assembled, pre-adjusted, spring-loaded, self-adjusting wear mechanism or device and includes a first member 370, a second member 372, a third member 374 (shown in FIG. 3), and an optional but preferred fourth member 376.

Figure 4:
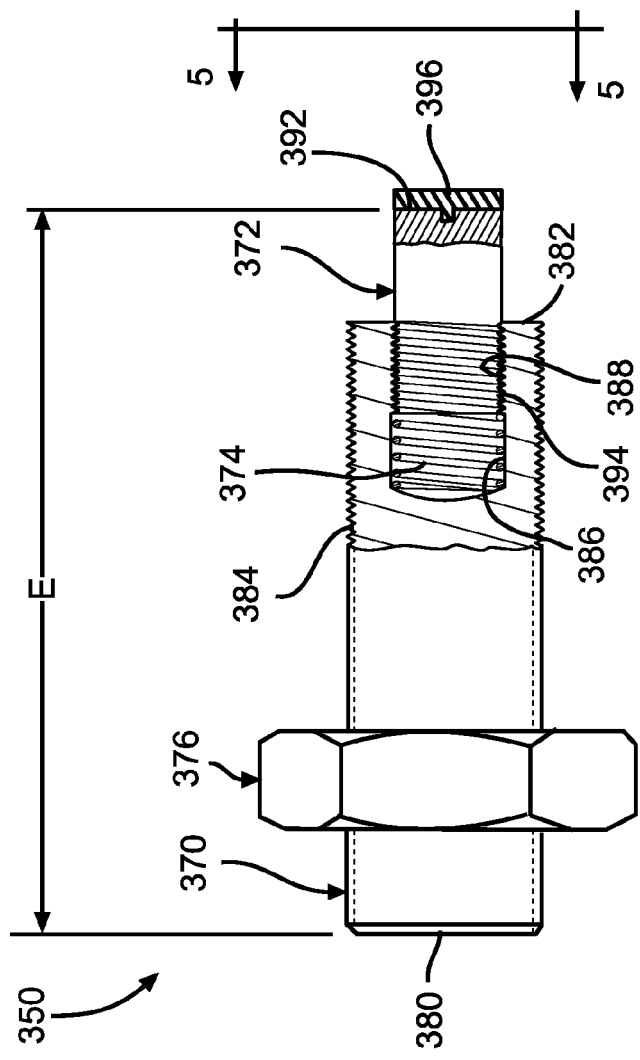
FIG. 4 is an enlarged view, partially cut away, of selected components of the improved yoke assembly illustrated in FIGS. 2 and 3.

As best shown in FIG. 4, the first member 370 is a generally annular and cylindrical-shaped and preferably has a first closed end 380 and an opposite second opened end 382. The first member 370 is provided with external threads 384 provided at least along a portion thereof extending from the first closed end 380 toward the second opened end 382. In the illustrated embodiment, the threads 384 extend the entire length of the first member 374. As will be discussed below, the external threads 384 are preferably a right hand thread and mesh with the internal threads 364 of the yoke cover 362 to allow the first member 370 to be threadably installed in the yoke cover 362.

In the illustrated embodiment, the first closed end 380 is preferably provided with a "mechanical adjusting" feature 386 which enables a suitable tool, such as a screwdriver, hex key or the like, to be used to adjust the position of the first member 370, and also the second member 372 relative thereto, as will be discussed below. In the illustrated embodiment, the feature 386 is an internal slot which enables a screwdriver to be used to install and adjust the position of the first member 370 within the yoke cover 352.

In the illustrated embodiment as shown in FIG. 3, the second opened end 382 of the first member 370 includes an internal bore 386 provided therein. The internal bore 386 extends a predetermined distance D from the second opened end 382 toward the first closed end 380. In the illustrated embodiment, the internal bore 386 preferably includes internal threads 388 which extend at least a portion of the distance D starting from the opened end 382 to threadably receive the second member 372 for a purpose to be discussed below. In the illustrated embodiment, the internal threads 388 are preferably a left hand thread for a purpose to be discussed.

In the illustrated embodiment, the second member 372 includes a first end 390 and an opposite second end 392. The second member 372 is provided with external threads 394 provided at least along a portion thereof extending from the first end 390 toward the second end 392. The external threads 394 are left hand threads which are configured to mesh with the internal threads 388 of the internal bore 386 for a purpose to be discussed below.

Figure 5:
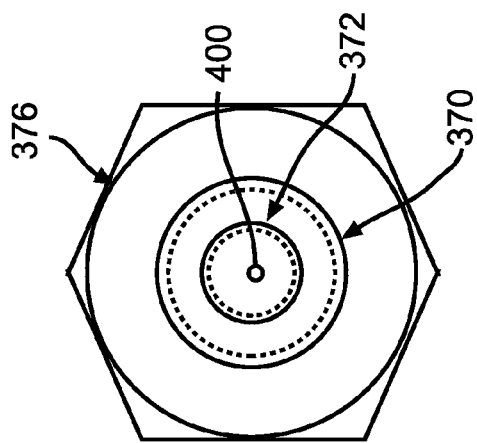
FIG. 5 is a view in the direction of arrow 5-5 of FIG. 4.

In the illustrated embodiment, the second end 392 is preferably provided with a fifth member secured or otherwise attached thereto. In the illustrated embodiment, the fifth member 396 is "optional" but preferred and preferably is a resilient material or elastomer end member or "tip" installed or otherwise secured thereto by suitable means. For example, the member 396 can be secured on the second end 392 by a press-fitting a tab or protuberance 398 provided thereon in an opening 400 (shown in FIG. 5; FIG. 5 not showing the member 396), provided in the second end 392 as illustrated. Alternatively, other suitable method which are operative to secure the member 396 to the end 392 of the second member 372 may be used if so desired, such as for example, bonding the member 396 in-situ therewith, using an adhesive or the like. As will be discussed below, the member 396 is used initially to aid in the installation process of the automatic-adjusting mechanism 350, and following assembly, is used for performance or "compensating" purposes during vehicle operation.

As shown in FIGS. 3 and 4, the third member 374 is preferably a compression spring and is disposed in the internal bore 386 of the first member 370. As will be discussed below, the spring 374 is provided with a predetermined nominal spring compression length so that following assembly installation the spring 374 is operative to provide a predetermined biasing or spring force against the first end 390 of the second member 372, and therefore against the yoke 358, for a purpose to be discussed below. Alternatively, the structure, configuration, and/or shape of one or more of the yoke cover 362 and/or the automatic-adjusting mechanism 350 can be other than illustrated and described if so desired.

The initial assembly of the automatic-adjusting mechanism 350 will now be described in detail. First, the spring 374 is disposed in the bore 386 of the first member 370 and then the second member 372 is threadably installed in the bore 386 to a predetermined initial installed position therewithin. Such a position can be determined by any suitable method, such as for example by measuring a distance E between the end 380 of the first member 370 and the end 392 of the second member 372.

The installation of the yoke assembly 356 in the yoke housing 34 will now be discussed. First, the spring 160 is installed and then the yoke cover 362 is threadably installed in the yoke housing 34. To accomplish this, the externally threaded outer surface 363 of the yoke cover 362 meshes with the internally threaded portion of the yoke housing 34 and the yoke cover 362 is advanced until preferably there is the gap G between the face 365 of the yoke cover 362 and the end face 360 of the yoke bearing 358.

Following this, the pre-assembled automatic-adjusting mechanism 350 is installed. To accomplish this, first, the fourth member 376, which can be a nut, if it is provided, is removed or retracted to the left to enable proper installation of the mechanism 350. Next, the mechanism is installed in the yoke cover 362 by engaging the external threads of the first member 370 with the internal threaded portion 364 of the yoke cover 362. Then, a suitable tool (not shown) is disposed in the feature 384 of the first member 370 to rotate the first member 370 within the yoke cover 362 and advancing the mechanism to the right in FIGS. 2 and 3 toward the bearing 358 and initially compressing the spring 160. As the first member 370 is further advanced to the right, the member 396 will initially engage the bearing 356. Following this initial engagement, the first member 370 is further advanced to the right a predetermined number of turns to a desired end turn position.

During such further advancement, since the external threads 394 on the second member 372 are opposite to the external threads 384 of the first member 370, as the first member 370 continues to be rotated the second member 372 will be rotated in an opposite direction, generally in a first axial direction as indicated by arrow C1 in FIG. 3, relative to the rotation of the first member 370. This causes the second member 372 to move to the left in FIGS. 2 and 3, thereby shortening the length that the second member 372 extends outwardly relative to the second end 382 of the first member 370. As a result of this, the second member "pre-loads" the spring 374 contained within the bore 386 of the first member 370.

Also, as discussed above, the member 396 is preferably provided and is an elastomer material which, as can be understood, will aid in retraction of the second member 372 to the left in the first member 370 by operatively providing a "gripping" or increased frictional level between the second member 372 and the bearing 356. With the first member 370 at the predetermined end turn position, the second member 372 will be at a predetermined retracted position within the first member 370 and the spring 374 will be pre-loaded to a predetermined spring load force. Alternatively, the method for installing and/or adjusting the position of the automatic-adjusting mechanism 350 can be other than illustrated and described if so desired.

Following installation and during vehicle operation, the automatic-adjusting mechanism 350 is effective, along with the spring 160, to apply a biasing force against the yoke bearing 358 to bias the yoke 54 against the rack 68. As wear of the yoke bearing 358 and/or yoke 54 occurs, the spring 160 will expand and continue to be operative to bias the yoke 54 against the rack 68. At the same time, due to the second member 372 of the automatic-adjusting mechanism 350 having the left hand threads 394 and being spring-loaded by the spring 374 in the bore 386 of the first member 370, as wear of the yoke bearing 358 and/or yoke 54 occurs the second member 372 will automatically "unscrew" and rotate outwardly and move generally in a second axial direction, as shown by arrow C2 in FIG. 3, to increase its effective length and thereby be maintained in contact against the yoke bearing 358 to stop or resist any movement of the yoke 54 away from the rack 68.

One potential advantage of the embodiment of the yoke assembly 310 of the present invention is that the automatic-adjusting mechanism 350 is operative to automatically and continually bias the second member 372, which effectively operates as a spring-loaded piston or abutment member, towards and in constant contact against the yoke bearing 358. As a result of this, if a force occurs during vehicle operation which tries to move the yoke 354 away from the rack 68, the second member 372 will be operative to act as a positive stop and oppose such force and prevent or reduce such separation from occurring between the yoke 354 and the rack 68. Thus, it can be seen that the automatic-adjusting mechanism 350 is effective to function as a "non-yielding" or "constant compliant" positive stop both before any wear occurs and also as wear occurs between the associated components of the rack and pinion steering gear. Another potential advantage is that the elastomeric member 396 provided on the end of the second member 372 can allow for slight movement (e.g., 0.05 mm), of the yoke 354 due to non-straightness of the rack 68.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A yoke assembly adapted for use in a rack and pinion steering gear assembly for a vehicle comprising:
   a yoke housing having a bore;
   a yoke bearing disposed in the bore;
   a yoke cover secured in the bore;
   a spring disposed in the bore between the yoke bearing and the yoke cover; and
   an automatic-adjusting mechanism secured in the yoke cover, the automatic-adjusting mechanism including a member which is configured to self adjust and move in a direction toward the yoke bearing so as to maintain the member in constant contact against the yoke bearing as components of the rack and pinion steering gear wear, wherein the automatic adjusting mechanism includes a first member having external threads configured to be threadably disposed in an internally threaded portion of the yoke cover, and wherein the self-adjusting member includes a second member having external threads configured to be threadably disposed in an internally threaded bore provided in the first member.

2. The yoke assembly of claim 1 wherein the member is a spring-loaded member.

3. The yoke assembly of claim 1 wherein the member includes an elastomer member at an end thereof which is maintained in constant contact against the yoke bearing.

4. The yoke assembly of claim 1 wherein the external threads of the first member extend in a first direction and the external threads of the second member extend in a second direction which is opposite to the first direction.

5. The yoke assembly of claim 1 wherein the automatic adjusting member further includes a third member disposed in the bore of the first member, the third member having an end in biasing contact against the second member.

6. The yoke assembly of claim 5 wherein the third member is a spring.

7. The yoke assembly of claim 1 wherein the first member includes means provided thereon configured to enable rotation of the first member relative to the yoke cover.

8. The yoke assembly of claim 1 wherein the automatic-adjusting mechanism further includes a nut disposed on the externally threaded portion of the first member.

9. A rack and pinion steering gear comprising:
   a housing configured to support a rack disposed in meshing engagement with a pinion, the housing including a yoke housing having a bore;
   a yoke bearing disposed in the bore;
   a yoke cover secured in the bore;
   a spring disposed in the bore between the yoke bearing and the yoke cover; and
   an automatic-adjusting mechanism secured in the yoke cover, the automatic-adjusting mechanism including a member which is configured to self adjust and move in a direction toward the yoke bearing so as to maintain the member in constant contact against the yoke bearing as components of the rack and pinion steering gear wear, wherein the automatic adjusting mechanism includes a first member having external threads configured to be threadably disposed in an internally threaded portion of the yoke cover, and wherein the self-adjusting member includes a second member having external threads configured to be threadably disposed in an internally threaded bore provided in the first member.

10. The yoke assembly of claim 9 wherein the member is a spring-loaded member.

11. The yoke assembly of claim 9 wherein the member includes an elastomer member at an end thereof which is maintained in constant contact against the yoke bearing.

12. The yoke assembly of claim 9 wherein the external threads of the first member extend in a first direction and the external threads of the second member extend in a second direction which is opposite to the first direction.

13. The yoke assembly of claim 9 wherein the automatic adjusting member further includes a third member disposed in the bore of the first member, the third member having an end in biasing contact against the second member.

14. The yoke assembly of claim 13 wherein the third member is a spring.

15. The yoke assembly of claim 9 wherein the first member includes means provided thereon configured to enable rotation of the first member relative to the yoke cover.

16. The yoke assembly of claim 9 wherein the automatic-adjusting mechanism further includes a nut disposed on the externally threaded portion of the first member.

17. A method for producing a rack and pinion steering gear comprising the steps of:
    installing a pre-adjusted, self-adjusting wear mechanism in a yoke cover of the rack and pinion steering gear by rotating a first member of the mechanism in a first direction until a second member of the mechanism engages a yoke bearing of the rack and pinion steering gear; and
    rotating the first member a predetermined number of turns relative to yoke cover so as to pre-load a second member of the mechanism relative to the first member by causing the second member to rotate in a second direction opposite to the first direction and be at least partially retracted therewithin.

18. The method of claim 17 wherein the first member has external threads configured to be threadably disposed in an internally threaded portion of the yoke cover, wherein the second member has external threads configured to be threadably disposed in an internally threaded bore provided in the first member, wherein the external threads of the first member extend in a first direction and the external threads of the second member extend in a second direction which is opposite to the first direction, and wherein the mechanism further includes a third member disposed in the bore of the first member, the third member having an end in biasing contact against the second member.

* * * * *